3 Sheets Sheet 3
Alfred C Platt's Power Accumulator
117454
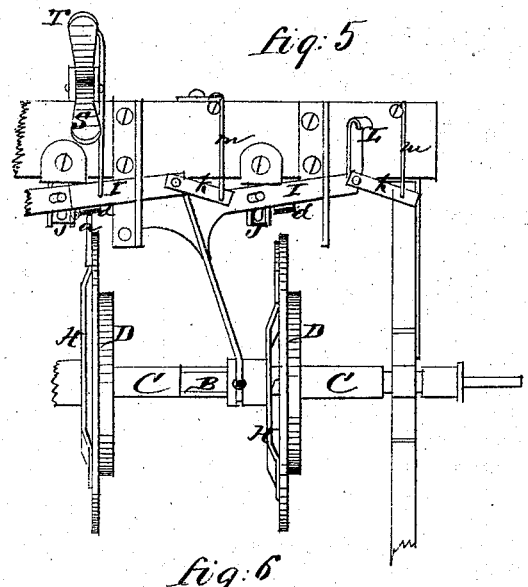
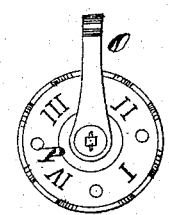
Witnesses
C. L. Evert.
Jas. E. Hutchinson
Inventor.
Alfred C. Platt
per
[signature]
Attys.

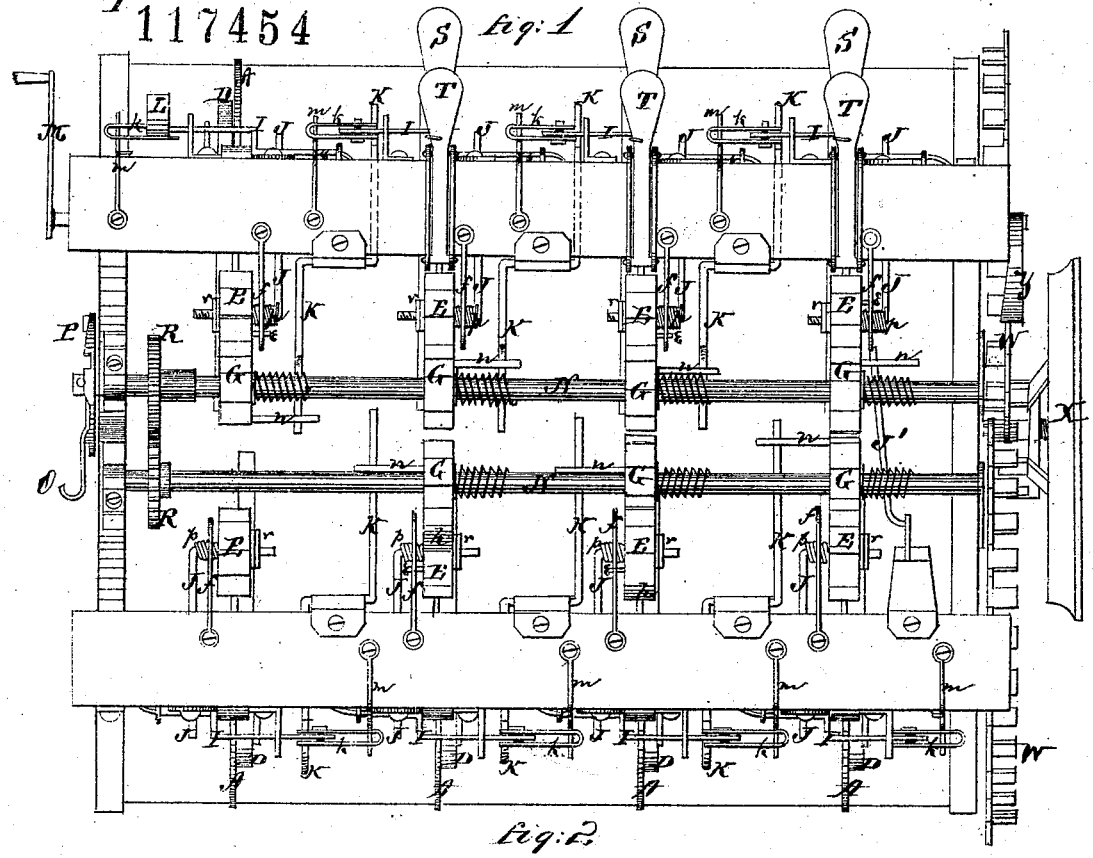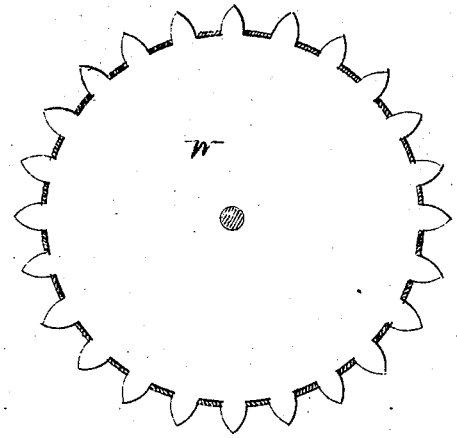

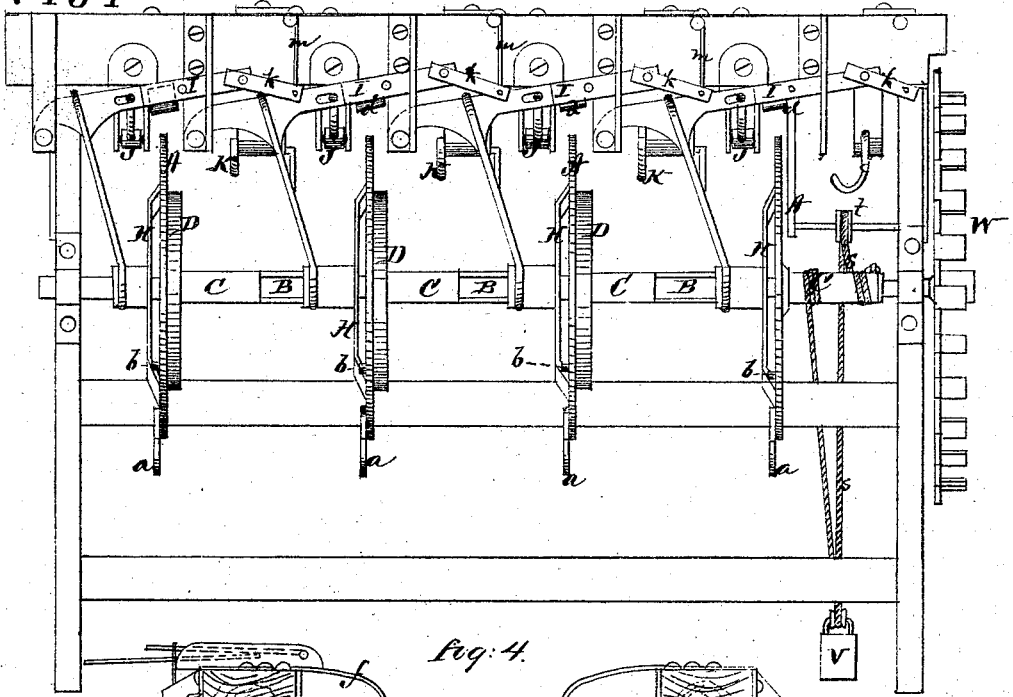
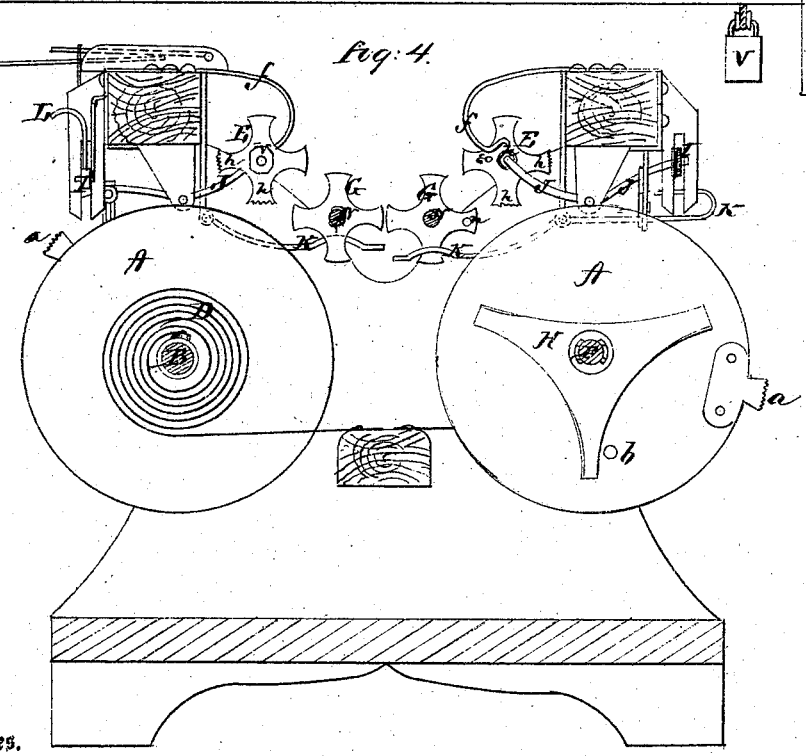

UNITED STATES PATENT OFFICE.

ALFRED C. PLATT, OF SANDUSKY, OHIO.

IMPROVEMENT IN APPARATUS FOR ACCUMULATING POWER.

Specification forming part of Letters Patent No. 117,454, dated July 25, 1871.

*To all whom it may concern:*

Be it known that I, ALFRED C. PLATT, of Sandusky, in the county of Erie and in the State of Ohio, have invented certain new and useful Improvements in Power-Accumulator; and do hereby declare that the following is a full, clear, and exact description thereof, reference being had to the accompanying drawing and to the letters of reference marked thereon making a part of this specification.

The nature of my invention consists in a machine for accumulating power derived from any suitable force, and retaining it to be used for the propulsion of the various kinds of machinery as wanted. This is accomplished by successively coiling or winding upon a shaft or system of shafting, a series of weights, springs, or other power, being connected with and disconnected from a central shaft or other device for transmitting the power by the automatic action of the machine itself.

In order to enable others skilled in the art to make and use the same, I will now proceed to describe its construction and operation, referring to the annexed drawing, in which—

Figure 1 is a plan view of the machine. Fig. 2 is a side view of one of the gear-wheels. Fig. 3 is a front elevation, and Fig. 4 a transverse vertical section of the machine. Fig. 5 is a partial front view, and Fig. 6 is a view of the device for regulating the power. Fig. 7 is side view of the device for using cord and weight.

A A represent a series of disks which revolves, when in action, with the central shaft B. A description of one of these disks and its connections and their operations will answer for all. Projecting from one side of the disk is an arbor, C, made hollow to receive the shaft B, and upon which arbor the spring or weight is wound. Upon the periphery of the disk A is a projection or tooth, a, which serves as a catch to hold the spring D or weight when not in action, and also to operate the wheels E and G, which disconnect and connect the power with the shaft, as will be shown. From the disk A, on the side opposite the arbor C, projects a point, b, with which the three-armed wheel H engages and disengages in connecting and disconnecting the power with the shaft. This wheel H revolves with the shaft B, and is made to slide longitudinally upon it, being operated by the lever I, and this lever is operated for the purpose of disconnecting the power with the shaft by the lever J, and for connecting the power by the lever K. The end of the lever J is connected with the wheel E, which has teeth or spurs upon it corresponding in number with the revolutions required to wind up the power. The lever K is actuated by the wheel G, which also is provided with the same number of teeth or openings as the wheel E. Through these openings the projection a on the disk a passes, actuating these wheels for purposes that will be hereinafter explained. On the lever I is a catch, against which the projection a and the disk A rest when the spring D or power is not in operation. The catch is provided with a roller, d, which rolls upon the edge of the disk if it comes in contact with it; but its chief office is, after passing the center at the top of the projection a, to throw, by the force of the spring or weight, the lever I immediately up, and thereby bring the wheel H in close contact with the disk A in time to arrest and bring the force of the power upon the shaft as soon as liberated. In fact, thus arranged, the action of the spring forces connection with the shaft.

To wind up the power ready for application the first spring or weight is connected by hand by raising the lever I by the thumb-piece L. Before winding, all the wheels E E should be raised—that is, all the springs disconnected—and the points e on the wheels E should be placed against the spring-braces f. Then commence winding, turning the crank M upon the end of the shaft B to the right. It should, however, also be observed, before winding, that all the projections a on the disks A are in their places against the wheel-stops or catch and roller d. The elevation of the lever I by the thumb-piece L brings the wheel E down so that the projection a upon the disk A acts upon it as it revolves, turning it one notch each revolution. This wheel should have as many openings as the number of revolutions required to wind up the power. Now, as the winding proceeds the projection a passes between the elongated toothed spurs h h of the wheel E, each revolution turning it one notch until the fourth, when (supposing this to be the number of revolutions of which this spring is capable) the projection a, instead of passing into a notch in the wheel, comes in contact with one of the toothed spurs h, because the point e has been caught in the spring-brace f. Teeth upon the projection *a* lock with teeth upon the spur, and the wheel E is raised, depressing by the lever J the lever I, thereby disengaging the power from the shaft. When the lever I passes the center of the bar *k* attached to its extreme end and connecting it with the spring *m*, it (the lever) is by this spring suddenly thrown down in time to catch the projection *a* upon the disk A, and thereby arrest the power when liberated from the shaft and retain it for use. In the revolution of this disk in winding, the projection upon it turns the wheel G upon the shaft N, and when the pin *n* projecting from said wheel comes in contact with the lever K it depresses said lever, raising by the opposite ends the next lever I for the next disk, thereby connecting the next spring or weight, which in turn connects the next, and so on through the whole system. To apply the power thus accumulated the first spring or weight is connected by hand. This is done as before by raising the lever I. When raised so that the wheel-catch *d* passes the center at the top of the projection upon the disk the lever I is immediately thrown up by the force of the spring *m*, and the three-armed wheel H suddenly brought in close contact with the disk A, catching the point *b* just as the spring D is liberated. The point *b* is beveled on the end, and the arms of the wheel H are beveled in an opposite direction, so that if, in approaching the disk, one of them should strike on this point it would slip by and catch on the next arm. The elevation of the lever I brings the wheel E down so that the projection *a* on the disk A acts upon it as it passes, turning it one notch each revolution, and on the fourth revolution, when run down or nearly so, (supposing it only capable of four revolutions,) the projection upon the disk, instead of passing between the spurs of the wheel E, comes in contact with one of the elongated toothed spurs *h*, by which it raises the wheel E, depressing the wheel-catch *d* and disconnecting by the same movement the power with the shaft, when the projection *a* passes forward and rests against the stop *d*. As the wheel E is raised by the toothed spur it throws the pin or point *e* projecting from it against the spring-brace *f*. This spring, as soon as the spur *h* of the wheel is liberated from contact with the projection *a* upon the disk, throws the wheel back, so that when it comes down the projection *a*, in winding up the power, passes between the two elongated toothed spurs *h h* instead of lifting the spur, as it would if it remained as left by the projection *a* in passing. Now, as it is evident that the wheel A being just back of where its moving projection rests, or just in front of it as the winding commences, provision must be made for one more movement in winding than unwinding, because in winding it makes one movement of the wheel E at the commencement of its first revolution, while in unwinding it does not make a movement of this wheel until it has completed, or nearly so, its revolution. This provision is made by the throwing back of the wheel E by the spring-brace *f*, so that the projection *a* on the disk A passes in winding between the two elongated toothed spurs *h h*, which gives five movements before one of the toothed spurs comes in contact with the projection *a*, or rather meets this on its fifth movement. This nice movement answers the double purpose of providing for this fifth movement and removing the toothed spur from where left by the projection *a*, so that as winding is commenced the projection *a* will not come in contact with it, which would disconnect the spring from the shaft. The wheel E is held from playing loosely by friction produced by the coiled spring *p*, and the amount of friction is regulated by the screw-nut *r* upon the opposite side. This friction should not be so great that the spring-brace *f* would throw the lever J down instead of turning the wheel upon it. The toothed spurs *h h* are made to project beyond the other spurs of the wheel E, so that with the same movement of the wheel they will be left in position to meet the projection *a*, except in the case where the wheel is moved back by the action of the spring-brace *f*. The amount of power is regulated and each succeeding spring or weight thrown into connection with the shaft by the wheels G G upon the shafts N N. This last effect is accomplished by the projection *a* on the disk A as it revolves, turning the wheel G until the pin *n* projecting from it depresses the end of the lever K, thereby throwing the next spring or weight into connection with the shaft. No provision for an extra movement of these wheels in winding is necessary, as in the wheels E E, for although in winding up the machine the projection *a* makes a movement of the wheel G at the commencement of the revolution of the disk A it is arrested in its last revolution just before reaching this wheel, so that only the same number of movements is made in winding as in unwinding. The pins *n n* in the wheels G G upon the shafts N N are all to be set in a line, and it is here designed that they should be in the direction of the spring-crank O upon the end of one of said shafts. For this purpose it is convenient to place the crank O pointing directly up, then all the pins vertically over the shaft in the direction with it. Now, if the crank O is turned to point 1 on the index P, the disk A in revolving, in winding up, will throw the next spring into connection on its third revolution, and leaves the pin *n* in position for throwing the next spring into connection of the first revolution of the disk A in running down. Thus left it is evident that the number of springs in power will be one less than the number of revolutions required to wind and unwind the power—that is, the last spring of this number will be thrown into power just as the first is disconnected. If the crank is placed on 2 on the index, then, in winding, the next spring will be thrown into connection on the second revolution of the disk A, and the pin *n* will be left in such a position that in running down the disk A on its second revolution will connect the next spring, and the number of springs in power will be equal to one-half the number of revolutions required to wind and unwind them. When the crank O is placed at 3 the next spring will be thrown into power in winding up on the first revolution of the disk A, and the pin $n$ left in position to throw the next spring into connection on the third revolution of the disk A in running down, and the number of springs brought into power will equal one-third the number of revolutions required to wind and unwind them. At number 4 the next spring will be connected in winding at the commencement of the first revolution of the disk A; but, in winding, this position should never be used unless it is desired to wind nearly all the springs or weights at once by some great force, as they would all be connected rapidly one after another. By placing the crank O at 4, where the power is applied, the number of springs brought into play will be equal to one-fourth the number of revolutions required to run down. The index P should have as many catches, and the wheels E and G should have as many spurs or openings, as the number of revolutions required to wind and unwind each spring or other power. In this case the number of revolutions required is supposed to be four, and consequently the next spring will be thrown into power just before the termination of the last revolution of the disk A if the crank O is at 4. This position should never be chosen where springs are used, as the first would become very weak before the next was added. For weights it might be convenient, as their power would be uniform.

It will be seen from this that the amount of power may be regulated by turning the spring-crank O to the different numbers on the index. On the index-plate are four catches to hold the crank and prevent the shafts turning by the independent action of any of the wheels upon them. It will be noticed, also, that only at index 2 the amount of power required for winding and unwinding is equal. From this point either way the power used for the two operations varies in proportion to the distance removed—for instance, if the whole number of springs were applied in using the power the pin $n$ would be left in such a position that only one would be brought into power at a time in winding, and vice versa. The shafts N N, on which the wheels G G turn, are connected together by the gear-wheels R R, of equal diameter, so that both are moved together by turning the crank O, and in the same direction relatively to the springs which they operate. Where it is desired to vary the power during the operation of the machine it can be done at the will of the operator by the keys S T. Pressing down on the outer or longest keys S connects the power with the shaft. This leaves the keys always open when the power is connected; and by pressing down on the upper keys T when open the power is disconnected from the shaft. Thus the operator will understand that where these keys are open the springs with which they connect are in operation, and that those back of the open ones have been used and their power exhausted while those in advance of them have not; and that to lessen the power being used it is only necessary to close the advanced ones of those which are open, or to increase the power to open more keys in advance. This means of controlling the power would be useful where an organ or kindred instrument was supplied by wind by such a machine, as the force of the wind could be varied as wanted at the will of the musician. The lever connecting the first spring or weight on the next shaft is operated and governed in all respects like the other connecting-levers, and is raised by a long lever, J', operated by the last wheel G on the first shaft, as shown in Fig. 1. To the first disk on this shaft (see Fig. 3) is attached a cord, $s$, with weight V, in the following manner: The cord $s$ passes under a pulley at the upper end of the weight, thus sustaining the weight, one end passing up and over a pulley, $t$, and down, connecting with the arbor of the disk. The other end of the cord passes directly up to the arbor in the same direction and attached to it. Thus, as the disk turns, both ends of the cord are wound upon the arbor, and when the disk is let loose to operate the machine both ends are unwound by the action of the weight turning the arbor and disk. It is evident that one-half the weight passing up over the pulley $t$ counterbalances the other half which hangs directly down from the arbor, thus avoiding unnecessary friction while the disk is at rest and the shaft revolving, and in this way the power of a great many weights could be applied to a long shaft or system of shafting with but little friction. The springs $m\ m$ hold the levers I I in position, and also serve to throw them immediately to their places after passing the center. The effect is, however, useful only on the downward motion, for on its upward motion the lever I is thrown, immediately after passing the center at the top of the projection $a$, to its place by the wheel-catch $d$. On this account the end or bearing-point of the spring is placed nearest the upper stopping-point of the lever I. The disks A are unnecessary, except as a guide on one side for narrow springs. Where weights are used, or wide springs, a simple arm running up from the arbor C to catch against the stop $d$ and operate the wheels E G, and provided on one side with a pin or stop for connecting with the device H, would answer. The main shafts communicating the power are connected by the gear-wheels W W, of equal diameter, and the power thus accumulated could be transmitted through this gearing, or the fly-wheel X, or by other means, to any other machine for any purpose required. The pawl or stop Y is thrown forward and used when a variable force is applied to the winding up of the machine. For instance, suppose that the force of the wind was applied for this purpose; in a lull the power of the weights or springs applied might exceed that of the wind when without this pawl; the instrument would run back or down to the extent of the springs or weights then in power; but by the use of this pawl no power could be lost in this way. For any purpose for which a uniform power is always required the shafts N N, with the wheels G G which they sustain, could be dispensed with, and each succeeding spring or weight thrown into connection by the action of the other wheels. For instance, suppose the power of two springs or weights were uniformly wanted; a pin in wheel E, operating through a lever, as the pin $n$ and wheel G operate through the lever K, could connect the next spring or weight when the first was one-half run down. This, except at the first half of the first spring or weight and the last half of the last, would be equivalent to the continual application of two springs or weights. It is evident where springs are used that the more that are brought into action at the same time the more uniform will be the power applied. Where weights are used, and a uniform power always required, the device would be still further simplified by arranging so that the same movement that throws off one power would connect the next. For coarse work, and most kinds of heavy stationary machinery where room is no object, weights might be preferable, being less expensive and more uniform in their effect. It will be noticed that as the springs D D are worked between extreme laxity and extreme tension, and being always thrown off before being closely wound, the danger of breakage is obviated. This arrangement for throwing off the springs in winding would be a source of safety to the single spring now in general use.

It will be seen that, by this arrangement, a great amount of power can be conveyed through a single shaft with little friction, for as the power of each spring or weight is applied the arbor moves with the shaft, and at other times the shaft plays loosely within it. The uses to which power thus accumulated could be applied with advantage are numerous. One great present need of it is for sewing-machines. It is found that the long-continued action of the feet and lower limbs in propelling sewing-machines is not only irksome, but produces permanent weakness and often causes dangerous disease, besides rendering sewing more difficult, diverting the attention as it does from the needle. The difficulty of starting the machine in the right direction where foot-power is used would be obviated by this device always starting it, as it would, the same way. The foot, resting upon a brake, could remove it from the fly-wheel of the sewing-machine, when it would start, and on removing the foot it would stop. In the spare room under the table of the machine sufficient power could be accumulated in this way to run a machine a whole day. The instrument could be wound by the man of the house in the morning, or the lady sewing could for a change of exercise get up and wind it; or in an establishment where a number of machines were in operation a man could be employed to wind them up, or the accumulator could be made detachable and taken away and wound up by steam or other power, or to another accumulator having power previously accumulated by a windmill or other means. By changing the crank O according to the power applied, the machine could be wound up more or less rapidly. With power accumulated in this way clocks could be made to run a great length of time without heavy strong machinery, powerful springs, and a large quantity of intermediate gearing. The surplus space usually contained in clock-cases would contain power enough accumulated in this manner to run the piece a very long time. Vertical shafts in a clock-case connected with the movement and actuated in this manner would serve a great length of time. A century-clock could be made with power thus accumulated. For organs and kindred musical instruments this mode of supplying wind will be found very valuable; but it is unnecessary to specify all the numerous uses to which this could be applied. It is evident that, thus accumulated, power could be used for nearly all the purposes for which machinery is required. This power could be accumulated in various ways. An economical source would be the almost continual force of the wind which, acting through a small windmill, would in this way accumulate a vast amount of power without the expense and friction of a great amount of intermediate gearing.

Having thus fully described my invention, what I claim as new, and desire to secure by Letters Patent, is—

1. A machine for accumulating power, in which a series of springs, weights, or other equivalent devices is connected and disconnected with a shaft or other device for transmitting that power, substantially for the purposes herein set forth.

2. The disk A, provided with the arbor C, projection $a$, and pin or stop $b$, substantially as and for the purposes herein set forth.

3. The wheel H, working upon the shaft B and provided with arms or spurs, substantially as and for the purposes herein set forth.

4. The beveled point $b$, in combination with the beveled arms or spurs of the wheel H, substantially as and for the purposes herein set forth.

5. The lever I for operating the wheel H, substantially as and for the purposes herein set forth.

6. The wheel-catch $d$, upon the lever I, for the purposes herein set forth.

7. The spring $m$, arranged to act upon the lever I, substantially as and for the purposes herein set forth.

8. The wheel E, held in place by the spring $p$, and provided with the point $e$ and toothed spurs $h\ h$, substantially as and for the purposes herein set forth.

9. The lever J, connected with the wheel E to operate the lever I, substantially as and for the purposes herein set forth.

10. The spring-brace $f$, arranged to operate upon the pin $e$ on the wheel E, substantially as and for the purposes herein set forth.

11. The wheel G, provided with the point or pin $n$ and placed upon the shaft N, substantially as and for the purposes herein set forth.

12. The lever K, operated by the pin $n$ on the wheel G for connecting the next spring or weight, substantially as herein set forth.

13. The lever J', operated by the pin $n$ on the last wheel G on one shaft for connecting the first power on the next shaft, as herein set forth.

14. The shafts N N, sustaining the wheels G G and geared together by the gear-wheels R R, substantially as and for the purposes herein set forth.

15. The spring-crank O to operate the shafts N N, substantially as herein set forth.

16. The index P, provided with catches for holding the shafts N N in position, substantially as herein set forth.

17. The keys S and T, arranged and operating substantially as and for the purposes herein set forth.

18. The main shafts B B, connected by gear-wheels W W for transmitting the power, substantially as herein set forth.

19. The application of weights, substantially in the manner and for the purposes herein set forth.

20. Disconnecting the spring D from the power winding it by its own action, substantially as and for the purposes herein set forth.

21. In a machine for accumulating power, constructed substantially as herein set forth, applying and releasing the power—i. e., connecting and disconnecting each of the springs D D or other equivalent appliance with the shaft B either by its own action or that of some other in the system—as and for the purposes described.

In testimony that I claim the foregoing I have hereunto set my hand this 24th day of March, 1871.

ALFRED C. PLATT.

Witnesses:
E. M. COLVER,
L. R. HAWES.